United States Patent [19]  [11] 4,205,507
McClure  [45] Jun. 3, 1980

[54] AQUATIC WEED CUTTING APPARATUS

[76] Inventor: James R. McClure, P.O. Box 105, Bridgewater, Va. 22812

[21] Appl. No.: 930,242

[22] Filed: Aug. 2, 1978

[51] Int. Cl.² ........................................ A01D 44/00
[52] U.S. Cl. ........................................ 56/8; 56/16.2
[58] Field of Search ........................... 56/8, 9, 16.2

[56] References Cited

U.S. PATENT DOCUMENTS

| | | | |
|---|---|---|---|
| 154,900 | 9/1874 | Piper | 56/8 |
| 1,259,456 | 3/1918 | Judson et al. | 56/9 |
| 1,797,957 | 3/1931 | Horste | 56/16.2 |
| 2,139,310 | 12/1938 | Marchek | 56/8 |
| 2,249,633 | 7/1941 | MacDonald et al. | 56/16.2 |
| 2,320,283 | 5/1943 | Knowlton et al. | 56/9 |
| 2,657,512 | 11/1953 | Crandon et al. | 56/8 |
| 2,699,025 | 1/1955 | Goss | 56/16.2 |
| 3,238,708 | 3/1966 | Zickefoose | 56/9 |
| 3,407,577 | 10/1968 | Fiske | 56/8 |

FOREIGN PATENT DOCUMENTS

| | | | |
|---|---|---|---|
| 899079 | 5/1972 | Canada | 56/8 |
| 433553 | 9/1926 | Fed. Rep. of Germany | 56/8 |
| 1302031 | 1/1973 | United Kingdom | 56/8 |

*Primary Examiner*—Jay N. Eskovitz
*Attorney, Agent, or Firm*—Schwartz, Jeffery, Schwaab, Mack, Blumenthal & Koch

[57] ABSTRACT

A floating aquatic weed cutting apparatus is disclosed which is highly maneuverable and particularly useful for cutting along banks and around obstacles. The cutter bar is disposed entirely outwardly of one of the lateral sides of a flotation device. The cutter bar may be moved about an axis parallel to the central axis of the flotation device to change the angular disposition of the cutter bar for cutting along submerged banks and around obstacles in the water. The entire cutter may be elevated with respect to the flotation device to raise or lower the cutter bar from or into the water.

15 Claims, 8 Drawing Figures

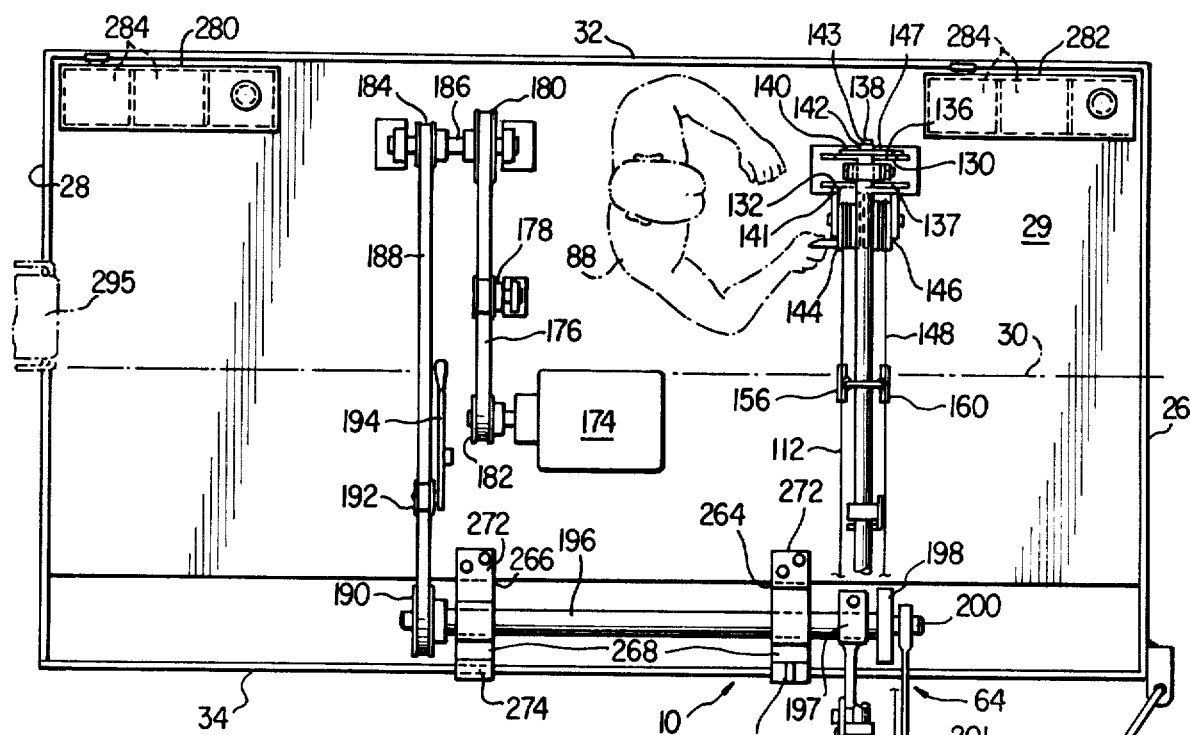
FIG. 1
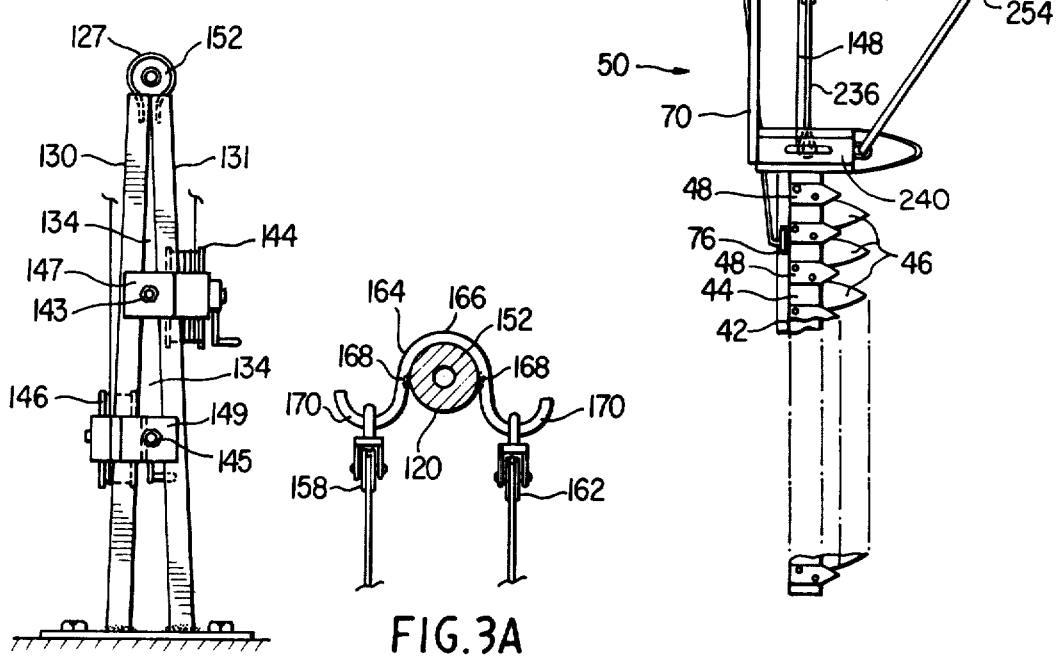
FIG. 3
FIG. 3A

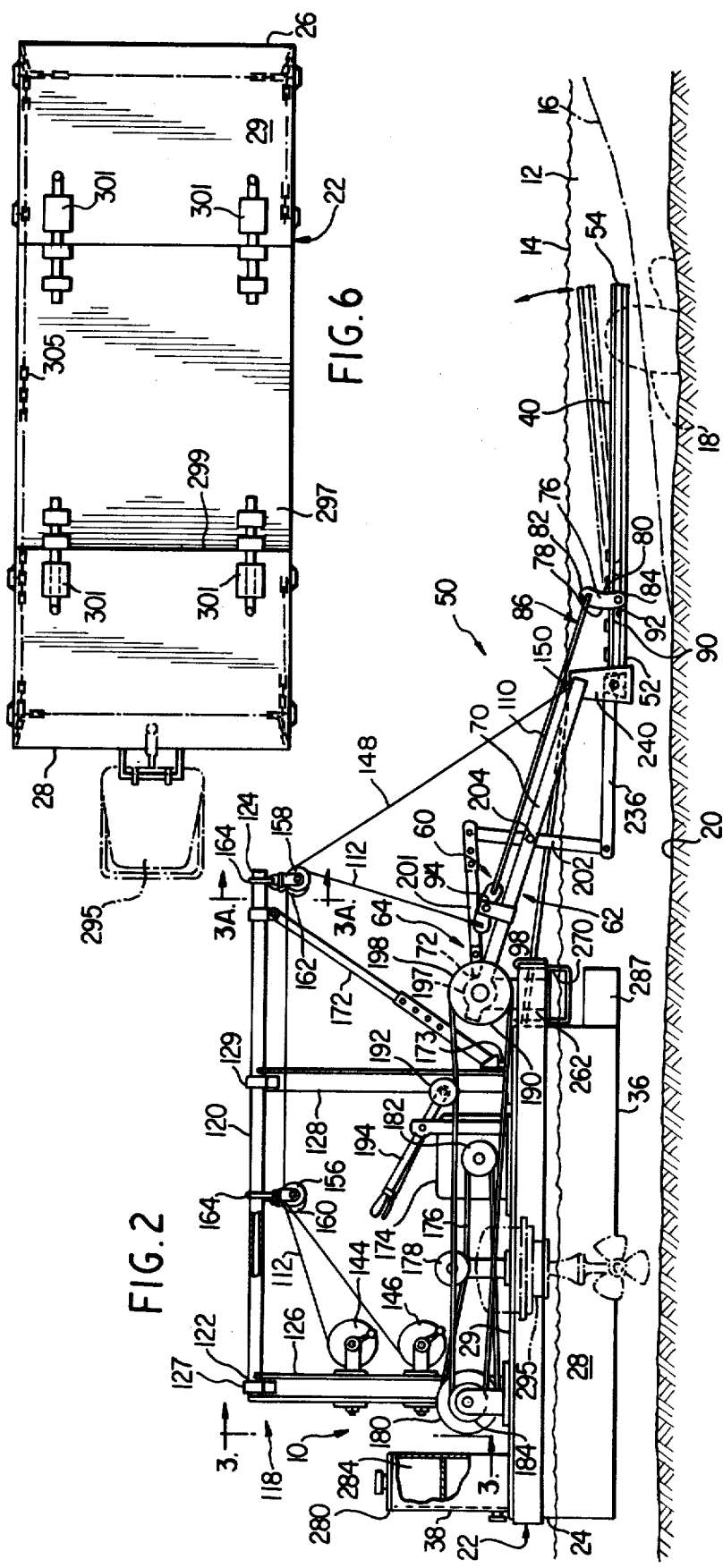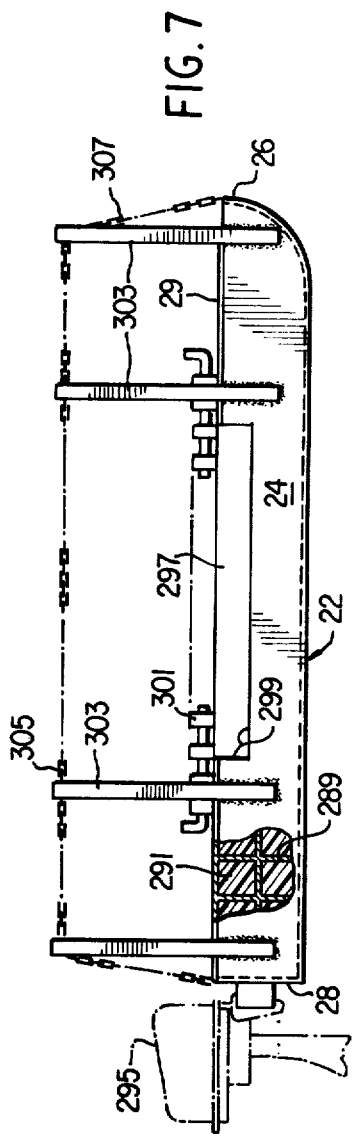

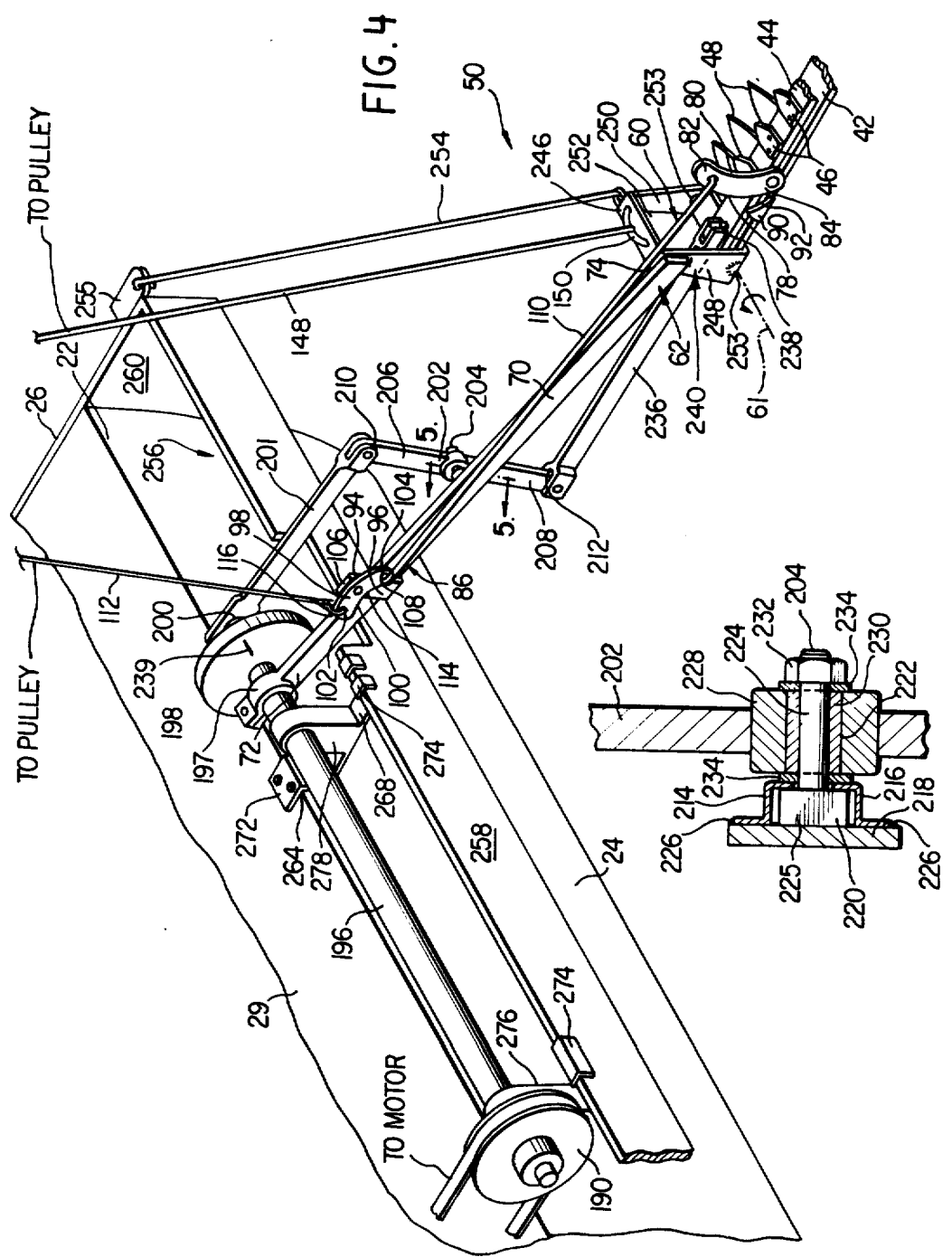

AQUATIC WEED CUTTING APPARATUS

BACKGROUND

1. Field of the Invention

The present invention relates to floating vessels for harvesting or cutting aquatic weeds at a level below the surface of the water.

2. Description of Prior Art

It is known to control aquatic weeds in lakes and waterways through the use of chemical herbicides. Such chemical weed control, however, has numerous disadvantages. The killed weeds generally fall to the bottom of the body of water and furnish nutrients to the water to promote further weed growth and considerable growth of algae. Generally the seeds are not killed by the herbicide, and the return growth of weeds is often intensified after chemical treatment. Further, the herbicides are usually toxic or dangerous to fish and other aquatic life. Also, they are very expensive for long term use.

Accordingly, there has been interest in mechanical harvesting aquatic weeds. Known aquatic weed cutters, however, tend to be large, expensive, difficult to maneuver, and they tend to lack flexibility for cutting difficult areas of waterways such as long banks, close to obstacles in the water, or in shallow water. An example of an aquatic weed cutter shown in U.S. Pat. No. 3,238,708 to Zickefoose.

Objects of the Invention

It is therefore an object of the present invention to provide an aquatic weed cutter which is relatively small, simple, and inexpensive and which has a shallow draft.

It is another object of the present invention to provide an aquatic weed cutter which is highly maneuverable.

It is yet another object of the invention to provide an aquatic weed cutter which facilitates cutting along submerged banks, around obstacles in a body of water and in very shallow water.

It is another object of the present invention to provide an aquatic weed cutter with means for supporting a cutter bar entirely outwardly of one lateral side of a flotation means in transverse relationship to the central axis of the flotation means.

It is yet another object of the present invention to provide an aquatic weed cutting apparatus wherein the cutter bar is pivotable about the end thereof nearest the flotation device to change angular disposition of the cutter bar with respect to the surface of the water.

It is a further object of the present invention to provide an improved mechanism for changing the angular disposition of the cutter bar.

It is yet another object of the present invention to provide an improved supporting means and driving means for the cutter bar.

It is a still further object of the invention to provide an improved crane, which crane may be used in connection with changing the angular disposition of the cutter bar or elevating the entire cutter bar with respect to the flotation device.

It is yet another object of the invention to provide a convertible flotation device in which the mechanism for supporting the cutter bar is mounted on a base, which base, in turn, is removably mounted on the flotation means, so that the weed cutting mechanism, support, and mounting base may be removed from the flotation device and the flotation device used for another purpose.

These and other objects and advantages of the present invention will be apparent from the following description and from the drawing.

SUMMARY

To achieve the foregoing objects, an aquatic weed cutting apparatus is provided which includes a flotation means having a front end, back end, a horizontal deck, a central axis extending from the front end to the back end, and a pair of lateral sides extending from the front end to the back end. The flotation means has a lower side for submersion in a body of water and an upper side for disposition above the surface of the body of water.

The apparatus of the invention includes an elongated cutter bar having a relatively stationary portion and a movable portion, each portion having a plurality of cutting teeth thereon. Also included are means for supporting the cutter bar with respect to the flotation means in a position entirely outwardly of one of the lateral sides of the flotation means in transverse relationship with respect to the central axis and spaced from the front and back ends of the flotation means. The supporting means itself is also spaced from the front and back ends of the flotation means. The cutter bar has a first end nearest the flotation means and a second end remote therefrom.

The supporting means includes means for changing the angular disposition of the cutter bar with respect to the surface of the water by moving the cutter bar about a horizontal axis parallel to the central axis of the flotation means by moving the second end of the cutter bar relative to the first end thereof. This changing means facilitates cutting along submerged banks and around obstacles in the body of water. This supporting means also includes means for elevating the entire cutter bar with respect to the flotation means to raise or lower the cutter bar from or to the water. The apparatus of the invention also includes means extending between the flotation means and the cutter bar for driving the movable cutter bar portion with respect to the stationary cutter bar portion to effect a cutting action.

According to more specific aspects of the invention, the mechanism for changing the angular disposition of the cutter bar includes a cresent-shaped shoe having a convex side, a concave side, and opposite ends, the shoe being pivotally mounted adjacent one of its ends to the stationary portion of the cutter bar adjacent the first end thereof. This changing means also includes means, extending between the shoe and the flotation means and attached to the other end of the shoe, to pivotally move the shoe under the control of a human operator on the flotation means. The changing means further includes a protrusion on the stationary portion of the cutter bar, the protrusion being located adjacent the shoe on the convex side thereof. The protrusion includes a concave portion on the side thereof facing the second end of the cutter bar. The concave side of the shoe is cooperatively engageable with the concave side of the protrusion to effect movement of the second end of the cutter bar relative to the first end thereof in response to movement of the shoe moving means.

The elevating means includes a support member having a first end disposed in the region of the flotation means and pivotably mounted with respect thereto and a second end coupled with the first end of the cutter bar.

The changing means further includes crank means mounted on the support member, the crank means including a crank element which is pivotable about a pivot point with respect to the support member, the crank element including a first end, a second end, a first connection point adjacent the first end, and a second connection point adjacent the second end. The changing means also includes an elongated link extending between one end of the crank element and the upper end of the shoe. The elongated link extends generally in the same direction as the support member.

The changing means further includes an adjusting cable connected to the other end of the crank element, the adjusting cable extending from the crank element to the flotation means to pivotably move the crank under the control of a human operator on the flotation means. The crank element has a crescent configuration with the concave side facing generally downwardly. The pivot point of the crank element is located generally midway between the first and second ends thereof, the pivot point being displaced from a line extending between the first and second connection points of the crank element.

The upper side of the flotation means has a crane thereon, the crane including a generally horizontally extending boom spaced above the deck and a plurality of crane legs extending between the flotation means and the boom to support the boom. The changing means and the elevating means are operatably coupled with the crane. The elevating means includes an elevating cable attached a stirrup adjacent the first end of the cutter bar. The adjusting cable and elevating cable are coupled with the crane. The crane includes a first winch on which the adjusting cable is wound and a second winch on which the elevating cable is wound.

The boom of the crane includes an anchored end disposed above the flotation means and a free end disposed outwardly of the flotation means. The legs of the crane include a rear leg assembly at the anchored end and a forward leg assembly spaced from the rear leg assembly in the direction of the free end of the boom. The rear leg assembly includes a pair of generally upright channel-shaped pieces joined to each other and to the boom at the anchored end of the boom. The channel-shaped pieces diverge from each other in a downward direction to form a passage therebetween. Each channel-shaped piece has a pair of spaced side pieces and a web extending therebetween. The channel-shaped pieces are disposed in back-to-back relationship such that the side pieces are disposed in first and second common planes. The first and second winches are engagingly clamped to the side pieces by means extending through the passage between the channel member.

The boom of the crane is an elongated cylindrical member with an elongated cylindrical hole extending entirely therethrough. The diameter of the cylindrical hole is less than one-half the diameter of the elongated cylindrical member. Preferably, the diameter of the cylindrical hole will be approximately one-fourth the diameter of the cylindrical member.

The driving means includes a rotatably driven element on the flotation means. A transverse arm is mounted on the support member for movement about a pivot axis, the transverse arm extending generally transversely of the support member and having portions extending to either side of the pivot axis. A first driving arm extends between the rotatably driven element and an upper end of the transverse arm. The first driving arm is connected such that rotation of the rotatably driven element imparts reciprocating movement to the first driving arm and such that this reciprocating movement imparts pivoting movement to the transverse arm.

A second driving arm is connected between a lower end of the transverse arm and the first end of the movable cutter bar portion. The second driving arm is so connected that pivoting movement of the transverse arm imparts reciprocating movement to the second driving arm to, in turn, impart reciprocating movement to the movable cutter bar portion. Thus, movement of the first driving arm in one direction is accompanyed by movement of the second driving arm in the opposite direction to contribute to balancing of forces in operation. The first and second driving arms are of equal length and the portions of the transverse arm extending to either side of the pivot axis are both of equal lengths.

As mentioned, there is a mounting stirrup pivotably coupled with the first end of the cutter bar, and this stirrup mounts the cutter bar on the support member. The mounting stirrup includes a top element and a pair of spaced upstanding leg elements extending between the cutter bar and the top element. The leg elements of the mounting stirrup define an opening through the mounting stirrup. The support member joins the mounting stirrup in the region of the top element thereof. The second arm of the driving means is movable through the opening in the mounting stirrup irrespective of the angular disposition of the cutter bar and irrespective of the cutting height adjustment thereof.

There is a well on one lateral side of the flotation means. The well provides access from above to an area of the flotation means below the horizontal deck thereof. The well includes mounting means having lower portions disposed substantially below the level of the horizontal deck. The rotatably drivent element is mounted on the lower portions of the mounting means.

According to an alternative embodiment, the supporting means and driving means may be mounted on a base separate from the flotation means, and the flotation means may include means for removably coupling the base to the flotation means. In this regard, the flotation means may also include a central recess extending across the flotation means, the central recess being spaced from the front and back ends of the flotation means, the base being removably coupled with the recess.

BRIEF DESCRIPTION OF THE DRAWING

FIG. 1 is a fragmentary plan view of an embodiment of the aquatic weed cutter of the present invention.

FIG. 2 is a rear elevational view of the aquatic weed cutter of the present invention showing certain submerged elements and showing the aquatic weed cutter in relationship to a body of water.

FIG. 3 is an elevational view of the crane of the aquatic weed cutter of the present invention taken from the rear of the crane and omitting the pulleys and pulley hanger brackets.

FIG. 3A is a sectional view taken on the line 3A—3A of FIG. 2 showing a hanger for the pulleys on the boom of the crane.

FIG. 4 is a fragmentary detailed perspective view of certain portions of the flotation means, driving means, and supporting means of the aquatic weed cutter of the present invention.

FIG. 5 is a fragmentary cross sectional view taken on the line 5—5 of FIG. 4.

FIG. 6 is a plan view of a convertible flotation device according to an alternative embodiment of the invention.

FIG. 7 is a side elevational view, partly in section, of the flotation device of FIG. 6.

DETAILED DESCRIPTION

In the following description, and in the drawing, like reference characters refer to like features or elements or features among the various figures and embodiments shown and described.

Referring to FIGS. 1 and 2, reference numeral 10 generally designates the aquatic weed cutting apparatus of the present invention. Referring specifically to FIG. 2, there is shown a body of water 12 with a surface 14 in which the aquatic weed cutting apparatus 10 is disposed. The body of water 12 may include a bank 16 shown in phantom line and/or obstacles to weed cutting, such as obstacle 18 also shown in phantom lines. The body of water may have a shallow bottom 20 as shown.

The aquatic weed cutting apparatus 10 includes a flotation device 22 having a hull 24. Flotation device 22 includes a front end or bow 26 and back end or stern 28. Flotation device 22 also includes a horizontal deck 29 and a central axis 30 extending from front end 26 to back end 29. Also, a pair of lateral sides 32, 34 extend from front end 26 to back end 28 of flotation device 22. Flotation device 22 has a lower side 36 for submersion in the water 12 and an upper side 38 disposed above surface 14 of the body of water 12.

The weed cutting apparatus 10 includes a generally conventional, elongated cutter bar 40 having a relatively stationary portion 42 and a portion 44 which is moveable relative to stationary portion 42. Cutter bar portion 42 includes teeth 46 and cutter bar portion 44 includes teeth 48 thereon.

Apparatus 10 also includes a mechanism for supporting cutter bar 40 with respect to flotation device 22 in a position entirely outwardly of lateral side 34 in transverse relationship with respect to central axis 30 and spaced from the front and back ends 26, 28 of flotation device 22. This supporting mechanism is generally referred to by reference character 50. Supporting mechanism 50 is itself also spaced from front to back ends 26, 28 of flotation device 22.

Supporting mechansim 50 includes a mechanism for changing the angular disposition of cutter bar 40 with respect to surface 14 of the water by moving cutter bar 40 about a horizontal axis 61 parallel to central axis 30 of flotation device 22 and, more particularly, by moving outboard end 54 of cutter bar 40 relative to inboard end 52 thereof. This changing mechanism is generally referred by reference character 60. Changing mechansim 60 facilitates cutting along submerged banks and around obstacles in a body of water. In this regard, the upper phantom line position of cutter bar 40 in FIG. 2 illustrates that the angular disposition of cutter bar 40 may be changed to accomodate a bank such as bank 16 or that outboard end 54 of cutter bar 40 may be raised to avoid an obstacle such as obstacle 18. This may be done without changing the overall height of the cutter bar. That is, the inboard end 52 of cutter bar 40 remains at the same depth so that the cutting effectiveness is not effected at that end where bank 16 or obstacle 18 does not interfere.

In this regard, it is also noted that the disposition of the cutter bar 40 entirely outwardly of lateral side 34 in transverse relationship with respect to central axis 30 and spaced from the front and back ends 36, 38 of flotation device 22, also contributes to facilitating cutting near banks, obstacles, or shallow portions. By providing cutter bar 40 with such a mounting disposition, the cutter bar may be adjusted or moved to precisely the right position for accommodating a difficult cutting situation, without having the added difficulty of possible interference of the flotation device 22 with the bank, obstacle, or shallow portion.

Support mechanism 50 also includes a mechanism for elevating the entire cutter bar 40 with respect to flotation means 22 to raise or lower cutter bar 40 from or into the water. This elevating mechanism is generally referred to by reference character 62. In addition, apparatus 10 includes means, extending between flotation device 22 and cutter bar 40, for driving movable cutter bar portion 44 with respect to stationary cutter bar portion 42 to effect a cutting action.

Elevating mechanism 62 includes a stabilizing bar or support member 70 having an inner end 72 disposed in the region of, i.e., adjacent to, flotation device 22 and pivotably mounted with respect thereto. Support member 70 also has an outer end 74 coupled with inboard end 52 of cutter bar 40.

Changing mechanism 60 includes a crescent-shaped shoe 76 with a convex side 78 facing inwardly with respect to flotation device 22 and a concave side 80 facing outwardly with respect to flotation device 22. Shoe 76 has an upper end 82 and a lower end 84, ends 82, 84 being disposed opposite to each other. Shoe 76 is pivotably mounted adjacent its lower end 84 to stationary portion 42 of cutter bar 40 adjacent inboard end 52 of cutter bar 40. Changing mechanism 60 also includes means, generally referred to by reference character 86, to pivotally move shoe 76 under the control of a human operator 88 (shown only in FIG. 1) on flotation device 22. Shoe moving means 86 extends between shoe 76 and flotation device 22.

Changing mechanism 60 further includes a protrusion 90 on stationary portion 42 of cutter bar 40. Protrusion 90 is located adjacent shoe 76 on convex side 78 thereof. Protrusion 90 includes a concave portion 92 on the side thereof facing inboard end 52 of cutter bar 40. Convex side 78 of shoe 76 cooperatively engages concave portion 92 of protrusion 90 when shoe 76 is moved in the counterclockwise direction (as viewed in FIGS. 2 and 4) via shoe moving means 86.

As will be apparent from FIGS. 2 and 4, convex side 78 of shoe 76 and concave portion 92 of protrusion 90 curve in the same general direction, i.e. side 78 and portion 92 have generally corresponding curvatures. Protrusion 90 thus acts as a gentle stop as a result of the corresponding, interengaging curvatures. When protrusion 90 is fully engaged by shoe 76 after counterclockwise pivoting of the shoe, continued counterclockwise movement (as viewed in FIGS. 2 and 4) of shoe 76 then effects vertical raising of the outboard end 54 of cutter bar 40 with respect to inboard end 52 thereof. That is, cutter bar 40 pivots about horizontal axis 61 in the counterclockwise direction as viewed in FIGS. 2 and 4.

In addition to providing smooth yet positive engagement with protrusion 90, the crescent shape of shoe 76 also helps to achieve optimal leverage at various different angles of the cutter bar 40 and contributes to providing constant engagement of shoe 76 with protrusion 90 regardless of the angle of the cutter blade. It will be appreciated that, by providing an arrangement wherein cutter bar 40 is angularly raised only after engagement of crescent-shaped shoe 76 with protrusion 90, cutter bar 40 is left free to pivot about axis 61 in an upward direction (i.e. counterclockwise as viewed in FIGS. 2 and 4) during normal operation. Thus, if cutter bar 40 comes into contact during operation with a surface such as presented by a submerged object 18 or bank 16, cutter bar 40 is free to move upwardly of its own accord in pivoting action around axis 61 to glide over the interfering surface thereby preventing damage and avoiding the need to stop operation to accomodate the object. In this regard, the large teeth 46 on stationary portion 42 of cutter bar 40 also act as runners to aid cutter bar 40 in gliging over any objects or surfaces with which it comes into contact during operation. Of course, cutter bar 40 may also be deliberately moved by the operator to an angle other than horizontal by changing means 60. In this manner, all contact with object 18 or bank 16 is avoided in advance.

Changing mechanism 60 also includes a crank mechanism 94 mounted by a bracket 96 on support member 70. Crank mechanism 94 includes a crank element 98 which is pivotable about pivot point 100 (FIG. 4) with respect to support member 70. Crank element 98 includes an inward end 102, an outward end 104 an inward connection point 106 adjacent inward end 102, and an outward connection point 108 adjacent outward end 104. Changing mechanism 60 further includes an elongated link 110 extending between outward end 104 of crank element 98 and upper end 82 of shoe 76. Link 110 is pivotably connected both to shoe 76 and crank element 98. Elongated link 110 extends generally in the same direction as support member 70. Still further, changing means 60 includes an adjusting cable 112 connected to inward end 102 of crank element 98. Adjusting cable 112 extends from crank element 98 to flotation device 22 to pivotally move crank element 98 under the control of human operator 88. This, of course, imparts generally linear movement to link 110, which, in turn, imparts pivotal movement to shoe 76.

Crank element 98 also has a crescent configuration with a concave side 114 facing generally downwardly. Pivot point 100 (FIG. 4) is located generally midway between ends 104, 106 of crank element 98. Pivot point 100 is displaced from a line 116 extending between connection points 106, 108. This crescent shape of crank element 98 and the attendant displacement of pivot point 100 from line 116 provides optimal leverage during pivotal movement of crank 98 under the action of adjusting cable 112 to effect adjustment of the angular disposition of cutter bar 40 with respect to the surface of the water.

A crane 118 is disposed on upper side 38 of flotation device 22. Crane 118 includes a generally horizontally extending boom 120 spaced above horizontal deck 29. Boom 120 has an anchored end 122 at the rear of the crane above flotation means 22 and a free end 124 disposed outwardly of flotation mean 22. Crane 118 has a rear leg assembly connected at anchored end 122 of boom 120 by bracket 127. Similarly, crane 118 has a forward leg assembly 128 spaced from rear leg assembly 126 in the direction of free end 124 of boom 120 and connected to boom 120 by bracket 129. Forward leg assembly 128 is constructed of conventional angle iron. Rear leg assembly 126 includes a pair of generally upward channel-shaped pieces 130, 132, preferably conventional channel iron, joined to each other and to boom 120 at anchored end 122 of the boom. Upright channel pieces 130, 132 (FIG. 3) diverge from each other in a downward direction to form a passage 134 of triangular cross section therebetween. Channel piece 130 includes a pair of parallel, spaced, flat side pieces 136, 137 and a web 138 extending therebetween (FIG. 1). Similarly, channel piece 132 includes a pair of spaced, parallel, flat side pieces 140, 141 and a web 142 extending therebetween (FIG. 1). Channel pieces 130, 132 are disposed in back-to-back relationship so that side pieces 136, 140 are disposed in first common plane and side pieces 137,141 are disposed in a second common plane which is parallel to the first common plane.

Elevating mechanism 62 includes an elevating cable 148 attached to mounting stirrup 240 by a yoke 150. In general, changing mechanism 60 and elevating mechanism 62 are operatably coupled with crane 118. In particular, adjusting cable 112 of changing mechanism 60 and elevating cable 148 of elevating mechanism 62 are coupled with crane 118. Crane 118 includes an adjusting winch 144 on which adjusting cable 112 is wound and an elevating winch 146 on which elevating cable 148 is wound. Of course, winches 144, 146 include the usual one-way mechanism such that cutter bar 40 may be held by the winches at various dispositions with respect to the surface of the water. Winches 144, 146 preferably having a braking reverse and are manual winches to be operated by operator 88. Of course, power winches can also be used.

It is to be understood that, although elevating cable 148 is attached to pivotally mounted, mounting-stirrup 240 for elevating cutter bar 40, elevating cable 148 does not affect the changing means 60 and angular cutter bar adjustment during the cutting operation. The crescent shape of shoe 76 and delayed engagement of shoe 76 with protrusion 90 contribute to this, as do the relative differences in the dispositions of the link 110 and elevating cable 148. In particular, elevating cable 148 is significantly more vertically oriented than link 110, and tension on cable 148 does not cause shoe 76 to come into full engagement with protrusion 90 when cutter bar 40 is in a cutting position.

The previously discussed relative disposition of sides 136, 137, 140, and 141 of channel pieces 130, 132 provides an especially suitable structure for mounting winches 144, 146. In this regard, winches 144, 146 are engagingly clamped to side pieces 136, 137, 140 and 141 by fasteners 143, 145 extending from each winch 144, 146, through passage 134 and engaging plates 147, 149 which are in abutting, clamping relationship with channel side pieces 136, 140 disposed in the first common plane. It will be apparent that fastener 143 is in tension to press plate 147 against channel sides 136, 140 to hold elevating winch 146 in place. It will also be apparent that with this arrangement the winches 144, 146 can be set at any desired height.

Boom 120 of crane 118 comprises an elongated cylindrical member 152 with an elongated cylindrical hole 154 extending entirely therethrough. To achieve optimal flexure characteristics for boom 130, elongated cylindrical 154 is smaller in diameter than the central passageway of commercially available pipe or tubing. Such pipe or tubing has insufficient strength verses size characteristics, while solid rod or bar stock is overly rigid. Preferably, elongated cylindrical hole 154 is drilled entirely through a piece of solid bar stock. For instance, in a prototype aquatic weed cutter according to the present invention, one and one-half inch round rod was used with a ⅜ inch hole drilled through the center. The relationship between the size of the cylindrical member 152 and hole 154 is such that the diameter of hole 154 is less than one-half the diameter of cylindrical member 152. Preferably, the diameter of cylindrical hole 154 is approximately one-fourth the diameter of elongated cylindrical member 152.

Adjusting cable 112 passes over spaced pulleys 156, 158 which depend from boom 120. Similarly, elevating cable 148 passes over similarly spaced pulleys 160, 162 which also depend from boom 120. Pulleys 156, 158, 160, 162 are coupled with boom 120 by specially configured hangers 164 which can be best seen by referring to FIG. 3A. Each hanger 164 includes a central upwardly bowed portion 166, which portion is preferably welded to elongated cylindrical member 152 of boom 120 at 168. Each hanger 164 also includes a pair of oppositely disposed outer portions 170 which are downwardly bowed, i.e. which are bowed in the opposite direction of central bowed portion 166. Outer bowed portions 170 act as hooks for suspending pulleys 157, 158, 160, 162. Preferably, each hanger 164 is of a one piece, continuous construction. In the aforementioned prototype, each hanger 164 was formed from a single piece of ⅜" round steel rod.

Crane 118 may include an adjustable brace 172 extending from the base of forward leg assembly 128 to a portion of boom 120 near free end 124 thereof. The lower end of adjustable brace 172 may include a swivel mount 173 to accommodate flexing of boom 120.

Driving mechanism 64 for driving cutter bar 40 includes a motor 174 on flotation means 22. Motor 174 drives a belt 176 which passes over a fixed idler pulley 178 to drive a pulley 180 which is substantially larger than pulley 182 at the output shaft of motor 174. This, of course, effects speed reduction. Large pulley 180 is drivingly connected to a substantially smaller pulley 184 by shaft 186. Smaller pulley 184 drives a belt 188 which in turn drives a substantially larger pulley wheel 190 to effect fruther speed reduction. A movable idler wheel 192 mounted on a m vable handle 194 is selectively engageable with belt 188 by operation of handle 194 to take up or provide slack in belt 188. This, in turn, engages or disengages the drive to larger pulley wheel 190 in a well known manner.

Larger pulley wheel 190 is coupled with an internal bearing drive shaft 196 in which the outer, visible portion of the shaft is stationary and the drive is effected through the interior of the outer tube in a known manner. The aforementioned pivotal connection of supporting member 70 with respect to flotation device 22 is accomplished by coupling supporting member 70 to this outer, stationary portion of drive shaft 196 by a yoke 197 which is free to pivotally move with respect to the outer stationary part of shaft 196. At the end of shaft 196 opposite large pulley wheel 190 is a rotatably driven element or flywheel 198 driven by pulley 190 via the internal drive of shaft 196. Flywheel 198 includes a connecting pin 200 eccentrically positioned with respect to the axis of flywheel 198. Eccentric connecting pin 200 is coupled with a upper driving arm 201 to which it imparts reciprocating movement.

Driving mechanism 64 also includes a transverse arm 202 mounted on support member 70 for movement about a pivot axis 204 which passes through support member 70. Arm 202 extends generally transversely of support member 70 and has a portion 206 extending to the upper side of support member 70 and a portion 208 extending to the lower side of support member 70 (see FIG. 4). Transverse arm 202 includes an upper end 210 and a lower end 212.

The details of the mounting of transverse arm 202 on support member 70 are best seen by reference to FIG. 5. The mounting is accomplished, in part, by a bracket 214 having a recessed area 216 and flanges 218. Recessed area 216 receives the head 220 of a bolt 222, the shank 224 of which extends through a hole 225 in recessed area 216 of bracket 214. Flanges 218 of bracket 214 are abuttingly attached to support member 70 by welds 226.

A casehardened hollow cylindrical member 228 is afixed to the center of transverse arm 202 and extends laterally to either side thereof. Cylindrical member 228 includes therewithin a self-lubricated bearing 230 such sold under the trademark "Oilite". Shank 224 extends through the interior of bearing 230 for cooperative, moving engagement therewith. The end of bolt 222 opposite head 220 is threaded and has a locknut 232 thereon to retain transverse arm 202 on the shank 224 of bolt 222. Shims 234 maintain cylinder 228 and bearing 230 in spaced relationship to bracket 214 and threaded locknut 232.

Driving mechanism 64 further includes a lower driving arm 236 connected between lower end 212 of transverse arm 202 and inboard end 52 of cutter bar 40, in particular the moveable portion 44 thereof. The connection between lower driving arm 236 and moveable cutter bar portion 44 is a conventional swiveling, releasable connection 238. As will be apparent from the foregoing and from the drawing, lower driving arm 236 is so connected that pivoting movement of transverse arm 202 imparts reciprocating movement to lower driving arm 236 to in turn impart reciprocating movement to moveable cutter bar portion 44. It will also be apparent that movement of upper driving arm 201 in one direction is accompanied by movement of lower driving arm 236 in the opposite direction by virtue of the pivotal reversing movement of transverse arm 202. This opposite movement of driving arms 201, 236 contributes to balancing of forces in operation and reduction of vibration. It is also noted in this regard that, as the eccentric pin 200 on flywheel 198 moves in one direction, for instance to the right in FIGS. 1, 2 and 4, moveable cutter bar portion moves in the opposite direction, i.e. to the left, in FIG. 4, and vice versa. Also, in this same regard, the upper and lower driving arms 201, 236 are of equal lengths and portions 206, 208 of transverse arm 202 are also both of equal lengths. To help ensure that moveable cutter bar portion 44 is at the far left end of its stroke (as viewed in FIGS. 1, 2, and 4) when eccentric pin 200 has moved to the right to the maximum extent, and vice versa, a timing mark 239 is disposed on flywheel 198. The timing mark is particularly useful for re-establishing the above condition after disassembly of portions of cutter bar 40 or driving mechanism 64.

The connection between the support member 70 and cutter bar 40 is accomplished via mounting stirrup 240 pivotally coupled with the inboard end 52 of cutter 40. Mounting stirrup 240 includes a top element 246 and a pair of upstanding leg elements 248, 250 which are spaced apart and which extend between the cutter bar 40 and top element 246. Top element 246 and upstanding leg elements 248, 250 define an opening 252 through mounting stirrup 240. Support member 70 is fixedly joined to said mounting stirrup, such as by welding, in the region of top element 246 of mounting stirrup 240.

Lower driving arm 236 of driving mechanism 64 moves through opening 252 in mounting stirrup 240 to drive moveable portion 44 of cutter bar 40. Opening 252 is of a relatively large size. In particular, it is of such size that the lower driving arm 236 may move through opening 252 irrespective of the angular disposition of cutter bar 40 with respect of support member 70 and irrespective of the cutting height adjustment thereof.

As indicated above, cutter bar 40 pivots about axis 61, and is noted here that axis 61 passes through the lower ends of leg elements 248, 250 of mounting stirrup 240. The pivotal mounting of cutter bar 40 of mounting stirrup 240 is accomplished by sockets 253 at the lower ends of upstanding leg elements 248, 250.

To provide additional support and guidance for cutter bar 40, an alignment rod 254 extends between mounting stirrup 240 and front end 26 of flotation device 22. In particular, one end of alignment rod 254 is pivotally connected to the mounting stirrup 240 and the other end is pivotally mounted by bracket 255 which is fixed with respect to flotation device 22. Pivotal connection of the ends of alignment rod 254 provide freedom for elevating the entire cutter bar 40.

Flotation means 22 includes a well 256 at lateral side 34 thereof. Well 256 provides access from above to an area of flotation means 22 below horizontal deck 29. Well 256 is partially defined by an elongated, lengthwise member 258 and short transverse members 260 (FIG. 4) and 263 (FIG. 2) extending between lengthwise member 258 and hull 24 of flotation means 22. It is obvious from the drawing that well 256 is in the form of a laterally enclosed interior space which is open from above. It is also apparent from the drawing that the pivot axis of support member 70 (which of course coincides with axis of shaft 196 by virtue of the pivotal yoke connection 197) is disposed inwardly of lengthwise extending member 258 and is located in the region of the well 256. Well 256 includes a pair of spaced mounting brackets 264, 266 disposed therein and extending thereacross.

Each mounting bracket 264, 266 has a lower portion 268, preferably in the form of a flat surface, supported by upwardly extending sides 270 (FIG. 2), an inboard upper flange 272, which rests on and is fixed to deck 29 (FIGS. 1 and 4), and an outboard, upper flange 274 which rests on and is fixed to lengthwise member 258. It will be apparent that lower portion 268 of each mounting bracket 264, 266 is disposed substantially below the level of horizontal deck 29. Part of driving mechanism 64 is mounted on the lower portions 268 of brackets 264, 266. Specifically, the internal bearing drive shaft 196 is mounted on lower portions 268 of mounting brackets 264, 266 by spaced shaft mounting members 276, 278 (FIG. 4). This enables part of the driving means 64, namely, large pulley wheel 190, internal bearing drive shaft 196, and flywheel 198 to be located closer to the water and closer to the cutter bar 40 than would otherwise be possible. Also, since support member 70 of elevating mechanism 62 is mounted on internal bearing drive shaft 96, the foregoing arrangement also allows the support member 70 to be pivotally coupled with respect to the flotation device 22 at a point closer to the water and closer to cutter bar 40. In both respects, the arrangement of the well and mounting bracket enhances simplicity of construction, contributes to compactness of the overall device, and results in increased maneuverability.

To compensate for cutter bar 40 and related supporting and driving elements being disposed entirely to lateral side 34 of flotation device 22, a pair of ballast tanks 280, 282 may be disposed on deck 29 adjacent the opposite lateral side 32 of flotation device 22. Ballast tanks 280, 282 are preferably constructed for containing water, and the amount of water in tanks 280, 282 may be varied to provide the best balance. To aid in maintaining the proper balance after it has once been achieved, ballast tanks 280, 282 may include a plurality of compartments 284, and only of certain of compartments 284 be filled.

As an alternative or addition to ballast tanks 280, 282, a removable balance float 287 (FIG. 2) may be attached to hull 24 of flotation device 22 under well 256 adjacent lateral side 34. Balance float 287 may be constructed of Styrofoam material. To provide maximum rigidity with minimum weight and also to guard against the possibility of sinking due to hull damage, hull 24 may have a grid-like, compartmentalized, internal construction. In this regard, a series of horizontal and vertical divider pieces 289 form a plurality of compartments 291 in hull 24. Compartments 291 may be filled with Styrofoam material. Although the internal construction of hull 24 has been shown in connection with the embodiments of FIGS. 6 and 7, it is to be understood that the hull construction is applicable to the embodiment of FIGS. 1-5.

Any suitable means may be used for propelling flotation device 22 through the water. In the embodiments illustrated in the drawing, a conventional outboard motor 295 is attached to back end 28 as shown. Controls such as a conventional outboard motor steering control and throttle control (not shown) may be placed in any convenient location for the operator 88. In the aforementioned prototype, the outboard motor, rather than being connected to flotation device 22, was connected to a separate flotation device (not shown) which in turn was connected to the flotation device having the supporting mechanism 50 driving mechanism 64, cutter bar 40 and crane 118 thereon.

As an alternative arrangement, cutter bar 40, supporting mechanism 50 (which includes changing mechanism 60 and elevating mechanism 62) driving mechanism 64 and crane 118 are mounted on a base 297 which is separate from flotation means 22 and which is removably coupled therewith. This allows the entire cutting apparatus to be removed from flotation means 22 when it is not needed or when maintenance or repair is required. Of course, with the cutting apparatus removed, flotation device 22 may be used for other purposes. For ease of illustration, cutter bar 40, supporting mechanism 50, driving mechanism 64 and crane 118 have not been shown on base 297. These elements, and indeed all the elements shown in FIGS. 1-5, however, will be mounted on base 297 of the embodiment of FIGS. 6 and 7 in the same manner that they are mounted on horizontal deck 29 in the embodiments of FIGS. 1-5, except that internal bearing drive shaft 196 will be mounted directly on base 297 rather than in a well, such as well 256.

Base 297 is removeably received in a central recess 299 in flotation device 22, which recess extends transversely across flotation device 22. Recess 299 is spaced from the front and back ends 26, 28 of flotation device 22. Recess 299 provides access to a portion of hull 24 substantially below the level of horizontal deck 29. The configuration of recess 299 is such that base or platform 297 fits closely therewithin. Once base 297 is properly positioned in recess 299, it is held there by releasable clamps 301.

As a safety factor, flotation device 22 includes a barrier around at least part of its periphery, the barrier including upright posts 303, transverse chains 305, and diagonal chain braces 307.

While the present invention has been shown and described in connection with certain illustrative and exemplary embodiments, it will be understood that many modifications, variations and other embodiments are possible without departing from the spirit and scope of the invention.

What is claimed is:

1. An aquatic weed cutting apparatus for use in a body of water having a surface, which body of water may include banks and obstacles, the apparatus comprising:
   (a) flotation means having a front end, a back end, a horizontal deck, a central axis extending from said front end to said back end, and a pair of lateral sides extending from said front end to said back end;
   (b) said flotation means having a lower side for submersion and an upper side for disposition above the surface of the body of water;
   (c) an elongated cutter bar having a relatively stationary portion and a portion movable relative to said stationary portion;
   (d) means for supporting said cutter bar with respect to said flotation means in a position entirely outwardly of one of said lateral sides of said flotation means in transverse relationship with respect to said central axis and spaced from said front and back ends of said flotation means, said supporting means itself also being spaced from said front and back ends of said flotation means, said cutter bar having a first end nearest said flotation means and a second end remote therefrom;
   (e) said supporting means including:
      (i) means for changing the angular disposition of said cutter bar with respect to the surface of the water by moving said cutter bar about a horizontal axis parallel to the central axis of said flotation means and thereby moving said second end of said cutter bar relative to said first end thereof, said changing means facilitating cutting along submerged banks and around obstacles in the body of water, and;
      (ii) means for elevating the entire cutter bar with respect to said flotation means to raise or lower said cutter bar from or into the water; and
   (f) means extending between said flotation means and said cutter bar for driving said movable cutter bar portion with respect to said stationary cutter bar portion to effect a cutting action;
   (g) said changing means including a crescent-shaped shoe having a convex side, a concave side, and opposite ends, said shoe being pivotally mounted adjacent one of its ends to said stationary portion of said cutter bar adjacent said first end thereof, said changing means also including means, extending between said shoe and said flotation means and attached to the other end of said shoe, to pivotally move said shoe under the control of a human operator on the flotation means, said changing means also including a protrusion on said stationary portion of said cutter bar, said protrusion being located adjacent said shoe on said convex side thereof, said protrusion including a concave portion on the side thereof facing said second end of said cutter bar, said convex side of said shoe being cooperatively engageable with said concave side of said protrusion to effect movement of said second end of said cutter bar relative to said first end thereof in response to movement of said shoe moving means.

2. An aquatic weed cutting apparatus as defined in claim 1 wherein said elevating means includes a support member having a first end disposed in the region of flotation means and pivotally mounted with respect thereto and a second end coupled with said first end of cutter car, said changing means further including crank means mounted on said support member, said crank means including a crank element which is pivotable about a pivot point with respect to said support member, said crank element including a first end, a second end, a first connection point adjacent said first end and a second connection point adjacent said second end, said changing means further including an elongated link extending between one end of said crank element and said upper end of said shoe, said elongated link extending generally in the same direction as said support member, said changing means further including an adjusting cable connected to the other end of said crank element, said adjusting cable extending from said crank element to said flotation means to pivotally move said crank under the control of a human operator on the flotation means.

3. An aquatic weed cutting apparatus as defined in claim 2 wherein said crank element has a crescent configuration with a concave side facing generally downwardly, said pivot point being located generally midway between said first and second ends, said pivot point being displaced from a line extending between said first and second connection points.

4. An aquatic weed cutting apparatus as defined in claim 2 including a crane on said upper side of said flotation means, said crane including a generally horizontally extending boom spaced above said deck and a plurality of crane legs extending between said flotation means and said boom to support said boom, said changing means and said elevating means being operatively coupled with said crane.

5. An aquatic weed cutting apparatus as defined in claim 4 including a mounting stirrup pivotally coupling said first end of said cutter bar to said support member and wherein said elevating means includes an elevating cable attached to said other end of said stirrup of said changing means.

6. An aquatic weed cutting apparatus as defined in claim 9 wherein said adjusting cable and said elevating cable are coupled with said crane.

7. An aquatic weed cutting apparatus as defined in claim 6 wherein said crane includes a first winch on which said adjusting cable is wound and a second winch on which said elevating cable is wound.

8. An aquatic weed cutting apparatus as defined in claim 7 wherein said boom includes an anchored end disposed above said flotation means and a free end disposed outwardly of said flotation means, wherein said legs of said crane include a rear leg assembly at said anchored end and a forward leg assembly spaced from said rear leg assembly in the direction of said free end of said boom, said rear leg assembly including a pair of generally upright channel-shaped pieces joined to each other and to said boom at said anchored end of said boom, said channel-shaped pieces diverging from each other in a downward direction to form a passage therebetween, each of said channel-shaped pieces having a pair of spaced side pieces and a web extending therebetween, said channel-shaped pieces being disposed in back-to-back relationship such that said side pieces of said channel-shaped pieces are disposed in first and second common planes, said first and second winches being engagingly clamped to said side pieces by means extending through said passage between said channel-shaped pieces.

9. An aquatic weed cutting apparatus as defined in claim 4 wherein said boom is an elongated cylindrical member with an elongated cylindrical hole extending entirely therethrough, the diameter of said cylindrical hole being less than one-half the diameter of said elongated cylindrical member.

10. An aquatic weed cutting apparatus as defined in claim 9 wherein the diameter of said cylindrical hole is approximately one-fourth the diameter of said cylindrical member.

11. An aquatic weed cutting apparatus for use in a body of water having a surface, which body of water may include banks and obstacles, the apparatus comprising:
   (a) a flotation means having a front end, a back end, a horizontal deck, a central axis extending from said from end to said back end, and a pair of lateral sides extending from said from end to said back end;
   (b) said flotation means having a lower side for submersion and an upper side for disposition above the surface of the body of water;
   (c) an elongated cutter bar having a relatively stationary portion and a portion movable relative to said stationary portion;
   (d) means for supporting said cutter bar with respect to said flotation means in a position entirely outwardly of one of said lateral sides of said flotation means in transverse relationship with respect to said central axis and spaced from said front and back ends of said flotation means, said supporting means itself also being spaced from said front and back ends of said flotation means, said cutter bar having a first end nearest said flotation means and a second end remote therefrom;
   (e) said supporting means including:
      (i) means for changing the angular disposition of said cutter bar with respect to the surface of the water by moving said cutter bar about a horizontal axis parallel to the central axis of said flotation means and thereby moving said second end of said cutter bar relative to said first end thereof, said changing means facilitating cutting along submerged banks and around obstacles in the body of water, and;
      (ii) means for elevating the entire cutter bar with respect to said flotation means to raise or lower said cutter bar from or into the water;
   (f) means extending between said flotation means and said cutter bar for driving said movable cutter bar portion with respect to said stationary cutter bar portion to effect a cutting action;
   (g) said elevating means including a support member having a first end disposed in the region of the flotation means and mounted with respect thereto for pivotal movement about a pivot axis and a second end coupled with said first end of said cutter bar, said driving means including a rotatably driven element on said flotation means and a plurality of linkage arms drivingly connected between said rotatably driven element and said first end of said cutter bar to translate rotary movement of said rotatably driven element into reciprocating movement of said cutter bar; and
   (h) a member which extends lengthwise of said flotation means, which member is disposed outwardly of said flotation means, which member is spaced from said flotation means, and which member is coupled therewith, said lengthwise extending member partially defining a well at one lateral side of said flotation means, said well being in the form of a laterally enclosed interior space which is open from above and which provides access from above to an area below said horizontal deck of said flotation means, said pivot axis of said support member being disposed inwardly of said lengthwise extending member and located in the region of said well, said well including mounting means having a lower portion disposed substantially below the level of said horizontal deck, said mounting means extending across said interior space of said well, said rotatably driven element being mounted on said lower portion of said mounting means.

12. An aquatic weed cutting apparatus as defined in claim 11 wherein said linkage arms of said elevating means include a transverse arm mounted on said support member for movement about a pivot axis, said transverse arm extending generally transversely of said support member and having portions extending to either side of said pivot axis, a first driving arm extending between said rotatably driven element and an upper end of said transverse arm, said first driving arm being connected such that rotation of said rotatably driven element imparts reciprocating movement thereto and such that reciprocating movement of said first arm imparts pivoting movement to said transverse arm, a second driving arm connected between a lower end of said transverse arm and said first end of said cutter bar, said second driving arm being so connected that pivoting movement to said transverse arm imparts reciprocating movement to said second driving arm to in turn impart reciprocating movement to said movable cutter bar portion, whereby movement of said first driving arm in one direction is accompanied by movement of said second driving arm in the opposite direction to contribute to balancing of forces in operation.

13. An aquatic weed cutting apparatus as defined in claim 12 wherein said first and second driving arms are of equal length and wherein said portion of said transverse arm extending to either side of said pivot axis are both of equal lengths.

14. An aquatic weed cutting apparatus as defined in claim 12 including a mounting stirrup pivotally coupled with said first end of said cutter bar for mounting said cutter bar on said support member, said mounting stirrup including a top element and a pair of spaced upstanding leg elements extending between said cutter bar and said top element, said leg elements of said mounting stirrup defining an opening through said mounting stirrup, said support member joining said mounting stirrup in the region of said top element of said mounting stirrup, said second arm of said driving means being moveable through said opening in said mounting stirrup irrespective of the angular disposition of the cutter bar and irrespective of the cutting height adjustment thereof.

15. An aquatic weed cutting apparatus for use in a body of water having a surface, the apparatus comprising:

(a) a hull having a front end, a back end, a horizontal deck, a central axis extending from said front end to said back end, and a pair of lateral sides extending from said front end to said back end;

(b) said hull having a lower side for submersion and an upper side for disposition above the surface of the body of water;

(c) a separate base removably coupled with said hull by coupling means;

(d) said hull including a recess at said upper side thereof, said recess providing access to a portion of said hull substantially below the level of said horizontal deck, said recess being spaced from said front and back ends of said hull; said recess extending entirely across said hull in a direction perpendicular to said central axis; said recess being configured to receive said base, said base being removably disposed within said recess and held there by said coupling means;

(e) said removable base having mounted thereon:

(i) an elongated cutter bar having a relatively stationary portion and a portion movable relative to said stationary portion;

(ii) means for supporting said cutter bar with respect to said base;

(iii) said supporting means including: means for changing the angular disposition of said cutter bar with respect to the surface of the water by moving said cutter bar about a horizontal axis parallel to the central axis of said hull and thereby moving said second end of said cutter bar relative to said first end thereof, said changing means facilitating cutting along submerged banks and around obstacles in the body of water; and means for elevating the entire cutter bar with respect to said base to raise or lower said cutter bar from or into the water; and (iv) means extending between said hull and said cutter bar for driving said movable cutter bar portion with respect to said stationary cutter bar portion to effect a cutting action.

* * * * *